US012630290B2

(12) United States Patent　　　　(10) Patent No.:　US 12,630,290 B2
Koustubhan et al.　　　　　　　　　(45) Date of Patent:　　May 19, 2026

(54) DEPLOYABLE ARMREST FOR AN AIRCRAFT SEAT

(71) Applicant: B/E Aerospace, Inc., Winston-Salem, NC (US)

(72) Inventors: Arjun Koustubhan, Hyderabad (IN); Raghavendra Kottem, Hyderabad (IN); Sambasiva Rao Kodati, Vinjaram (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 260 days.

(21) Appl. No.: 18/385,774

(22) Filed: Oct. 31, 2023

(65) Prior Publication Data

US 2025/0058880 A1　　Feb. 20, 2025

(30) Foreign Application Priority Data

Aug. 16, 2023　(IN) ............................. 202311054969

(51) Int. Cl.
　　B64D 11/06　　　(2006.01)
(52) U.S. Cl.
　　CPC ................................ B64D 11/0644 (2014.12)
(58) Field of Classification Search
　　CPC ................................................ B64D 11/0644
　　See application file for complete search history.

(56) References Cited

U.S. PATENT DOCUMENTS

| 8,931,834 | B2 | 1/2015 | Wallace et al. |
| 9,033,413 | B2 | 5/2015 | Round et al. |
| 10,279,916 | B2 | 5/2019 | Kinard et al. |
| 10,441,083 | B2 | 10/2019 | Muiter et al. |
| 11,498,681 | B2 | 11/2022 | Dowty et al. |
| 2008/0252109 | A1 | 10/2008 | Salzer et al. |
| 2013/0002001 | A1 | 1/2013 | Allen et al. |
| 2016/0318611 | A1 | 11/2016 | Brownjohn et al. |

(Continued)

FOREIGN PATENT DOCUMENTS

| EP | 3174792 B1 | 7/2020 |
| EP | 3741677 A1 | 11/2020 |
| EP | 3851376 A1 | 7/2021 |

(Continued)

OTHER PUBLICATIONS

European Search Report received in EP Application No. 24194586.4, Dec. 20, 2024, 7 pages.

*Primary Examiner* — Anthony D Barfield
(74) *Attorney, Agent, or Firm* — Suiter Swantz IP

(57)　　　　　　ABSTRACT

An aircraft seat includes a primary seating section including a primary seat pan and seatback. The aircraft seat further includes one or more deployable armrest assemblies, where each armrest assembly is configured to actuate between a stowed and deployed position. Each armrest assembly includes an actuator sub-system including a locking assembly and an actuator. Each armrest assembly further includes an armrest attaching panel. When the armrest assemblies are positioned in the deployed position, the armrest assemblies form an auxiliary seating section, where the armrest attaching panel is configured as an auxiliary seat pan. When the locking assembly is in the unlocked state, the actuator actuates the armrest assemblies to the deployed position. The auxiliary and primary seat pan form a wide seating surface when in the deployed position. A top surface of the auxiliary seat pan is substantially flush with a top surface of the primary seat pan cushion.

14 Claims, 17 Drawing Sheets

(56)  References Cited

U.S. PATENT DOCUMENTS

| 2021/0245886 | A1 | 8/2021 | Dowty et al. |
| 2022/0396186 | A1 | 12/2022 | Salter et al. |

FOREIGN PATENT DOCUMENTS

| ES | 2520691 | T3 | 11/2014 |
| GB | 2575025 | B | 11/2021 |
| WO | 2018042227 | A1 | 3/2018 |

DEPLOYABLE ARMREST FOR AN AIRCRAFT SEAT

CROSS-REFERENCE TO RELATED APPLICATION

The present application claims the benefit to India Provisional Patent Application No. 202311054969, filed Aug. 16, 2023, entitled DEPLOYABLE ARMREST FOR AN AIRCRAFT SEAT, naming Arjun Koustubhan, Raghavendra Kottem, and Sambasiva Kodati as inventors, which is incorporated by reference in the entirety.

TECHNICAL FIELD

The subject matter disclosed herein relates to the field of aircraft seats and, in particular, to a deployable armrest for an aircraft seat.

BACKGROUND

Current aircraft seats can be limited in space. Often such aircraft seats include an armrest for passengers to rest their arms, however, such armrests may limit seat space.

As such, it would be desirable to provide a deployable armrest that may provide add additional space.

SUMMARY

An aircraft seat is disclosed, in accordance with one or more embodiments of the present disclosure. In embodiments, the aircraft seat includes a primary seating section including a primary seat pan coupled to a seat pan cushion and a primary seatback coupled to a seatback cushion. In embodiments, the aircraft seat includes one or more deployable armrest assemblies. Each deployable armrest assembly is configured to actuate between one of a stowed position and a deployed position. In embodiments, each deployable armrest assembly includes an actuator sub-system. In embodiments, the actuator sub-system includes a locking assembly having a locked state and an unlocked state and an actuator configured to actuate the deployable armrest assembly between one of the stowed position and the deployed position. In embodiments, each deployable armrest assembly includes an armrest attaching panel coupled to the actuator sub-system. In embodiments, when the one or more deployable armrest assemblies are positioned in the deployed position, the one or more deployable armrest assemblies form an auxiliary seating section arranged proximate to the primary seating section, wherein the armrest attaching panel is configured as an auxiliary seat pan when the one or more deployable armrest assemblies form an auxiliary seating section. In embodiments, when the locking assembly of the actuator sub-system is in the unlocked position, the actuator of the actuator sub-system is configured to actuate the one or more deployable armrest assemblies to the deployed position. In embodiments, the auxiliary seat pan and the primary seat pan form one or more wide seating surfaces when in the deployed position. In embodiments, a top surface of the auxiliary seat pan is substantially flush with a top surface of the primary seat pan cushion of the primary seating section.

In some embodiments, each deployable armrest assembly may further include an auxiliary seatback configured to actuate forward about a pivot point.

In some embodiments, the armrest attaching panel may further include a layer of foam coupled to a top surface of the armrest attaching panel.

In some embodiments, the primary seating may further include a base assembly couplable to a floor of an aircraft cabin, where the base assembly includes one or more base brackets and the one or more deployable armrest assemblies are coupled to the one or more base brackets via one or more brackets coupled to the actuator sub-system.

In some embodiments, the one or more deployable armrest assemblies may include a single deployable armrest assembly coupled to a side of the base assembly.

In some embodiments, the one or more deployable armrest assemblies may include two or more deployable armrest assemblies, where the two or more deployable armrest assemblies include a first deployable armrest assembly coupled to a first side of the base assembly of the primary seating and an additional deployable armrest assembly coupled to an additional side of the base assembly of the primary seating.

In some embodiments, each deployable armrest assembly may further include a housing configured to at least partially enclose the actuator sub-system.

In some embodiments, the housing may further include a stationary housing portion, a deployable housing portion configured to actuate between one of the stowed position and the deployed position, and a divider line configured to separate the deployable housing portion and stationary housing portion.

In some embodiments, the locking assembly may further include a latch, a release mechanism and a release cable coupled to the release mechanism, wherein the release mechanism is configured to pull the release cable when a force is applied to the release mechanism, where upon applying the force to the release mechanism, the latch, when in the unlocked state, is configured to cause the actuator to actuate the one or more deployable armrest assemblies between one of the stowed position and the deployed position.

In some embodiments, the actuator sub-system may further include a translation system and a rotation system coupled to a frame, wherein the frame includes a slot and a rod coupled to an end of the actuator.

In some embodiments, the actuator may be a gas spring actuator.

In some embodiments, the translation system may include one or more tracking rails coupled to the one or more brackets and one or more carriages coupled to the frame, where the one or more carriages are configured to translate along an axis of the tracking rail.

In some embodiments, the rotation system may include a rotational rod including at least a first end and a second end, wherein the first end is coupled to a first bracket and the second end is coupled to an additional bracket, wherein the slot of the frame is configured to receive a shaft of the rotational rod, wherein the frame is configured to rotate about the axis of the shaft of the rotational rod within the slot.

In some embodiments, the actuator sub-system may be configured to actuate the one or more deployable armrest assemblies between the stowed position and deployed position by translating the frame along an axis of the one or more tracking rails, where the one or more carriages are configured to translate along the axis of the tracking rail to cause the frame to translate along the axis, when translating the frame along the axis, the shaft of the rotational rod configured to translate within the slot of the frame along the axis.

In some embodiments, upon translating the frame along the axis of the one or more tracking rails, the rotation system of the actuator sub-system may be configured to actuate the one or more deployable armrest assemblies between the stowed position and deployed position by rotating the rotational rod about the axis of the shaft of the rotational rod, where the frame rotates about the axis of the shaft of the rotational rod until the frame is arranged substantially parallel with the floor of the aircraft.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
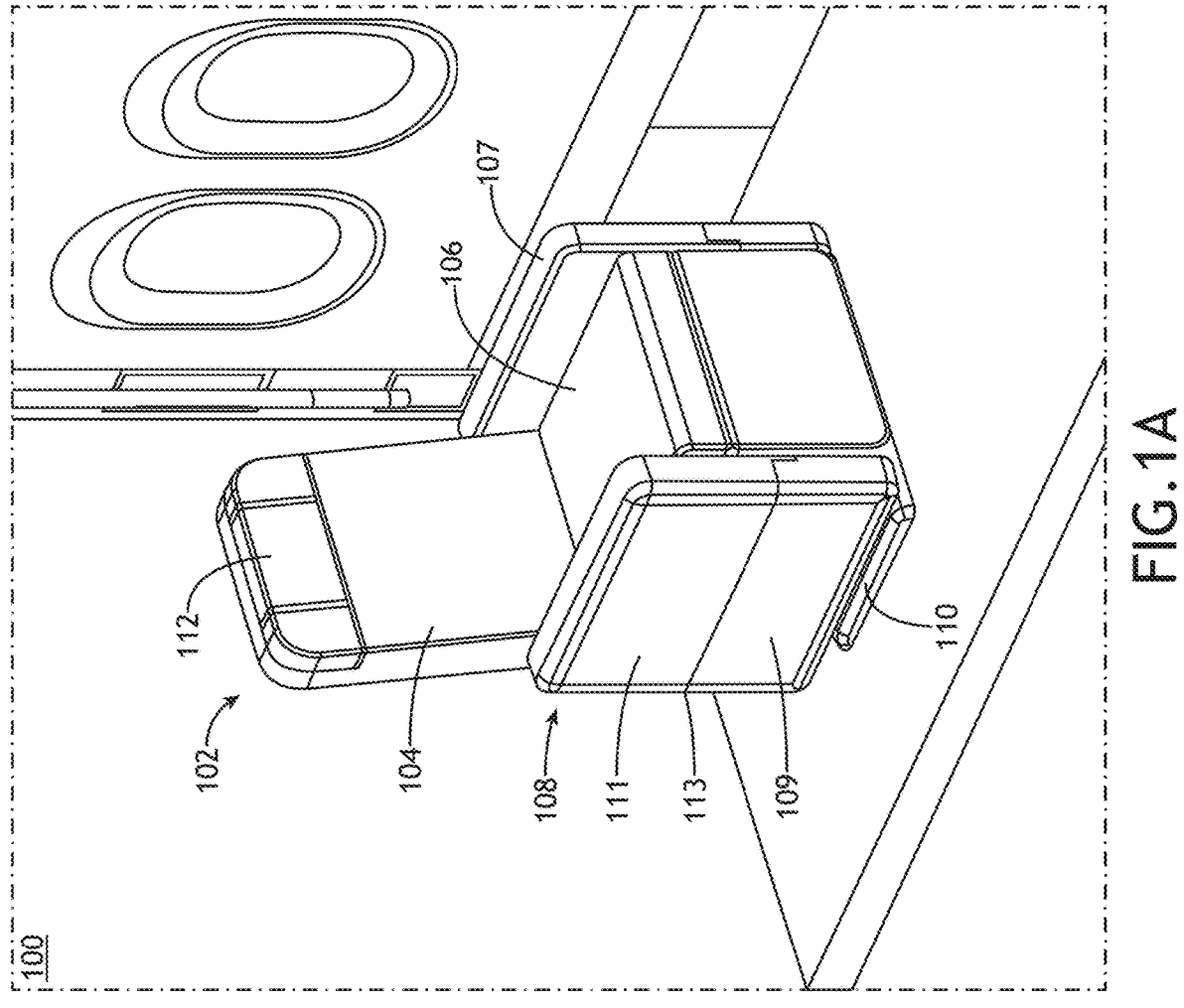
FIG. 1A illustrates a simplified schematic of an aircraft seat including one or more deployable armrest assemblies in a stowed position, in accordance with one or more embodiments of the present disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-1F in general illustrate an aircraft cabin 100 including an aircraft seat 102, in accordance with one or more embodiments of the disclosure. For example, the aircraft seat 102 may include, but is not limited to, a business class or first-class passenger seat, an economy-class passenger seat, a crew member seat, or the like. It is noted the terms "aircraft seats" and "passenger seats" may be considered equivalent, for purposes of the disclosure.

The aircraft seat 102 may be rotatable about an axis (e.g., swivelable). The aircraft seat 102 may be fully positionable between the outer limits of motion as defined by the moveable components of the aircraft seat 102. Where the aircraft seat 102 is installed within a passenger compartment, the aircraft seat 102 may be fully positionable between the outer limits of motion as defined by one or more passenger compartment monuments of the passenger compartment. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Further, it is noted the aircraft seat 102 may be actuatable (e.g., translatable and/or rotatable) from the TTL position to a non-TTL position, and/or vice versa. Further, it is noted the aircraft seat 102 may be capable of a fully upright or raised position, and that the TTL position may have a more reclined seatback cushion and a more angled upward seat pan cushion as compared to the fully upright or raised position. Therefore, the above description should not be interpreted as a limitation on the present disclosure but merely an illustration.

In general, an aircraft seat 102 may be translatable (e.g., trackable or slidable). The aircraft seat 102 may be rotatable about an axis cross-wise through the aircraft seat 102 into a position including, but not limited to, the upright or raised position, one or more lounge or reclined positions, and a lie-flat or bed position. For example, the aircraft seat 102 may transition directly between the upright or raised position and the lie-flat or bed position. By way of another example, it is noted the aircraft seat 102 may transition through one or more lounge or reclined positions between the upright or raised position and the lie-flat or bed position. By way of another example, the aircraft seat 102 may transition into one or more lounge or reclined positions in a motion separate from the transition between the upright or raised position and the lie-flat or bed position. Therefore, the above description should not be interpreted as a limitation on the scope of the disclosure but merely an illustration.

The aircraft seat 102 may include a seatback 104 (or primary seatback 104). The aircraft seat 102 may include a seat pan 106 (or primary seat pan). The aircraft seat 102 may include one or more armrests 107. For example, as will be discussed further herein, the one or more armrests 107 may include one or more deployable armrest assemblies 108. The aircraft seat 102 may be coupled to a base 110. The base 110 may be covered by a shroud. For example, the shroud may include one or more sections configured to cover at least a portion of the aircraft seat 102. For instance, the shroud may include a bucket shroud section and a base shroud section. It is noted, however, that the shroud may be formed from one piece (i.e., includes a single section).

For purposes of the present disclosure, it is noted herein that the "seatback 104" or "primary seatback 104" and the "seat pan 106" or "primary seat pan 106" may be referred to collectively as "the primary section" and the "auxiliary seatback portion 114" and "auxiliary seat pan 115" may be referred to collectively as the "the auxiliary section", which together form the wide seating area 116.

The seatback 104 may include a headrest 112. For example, the headrest 112 may be integrated within the seatback 104. By way of another example, the headrest 112 may be a separate component coupled to (or inserted into) the seatback 104. For instance, the headrest 112 may be movable relative to the seatback frame of the aircraft seat 102 (e.g., adjustable, removable, or the like).

The seat pan 106 may be coupled to the seatback 104, such that actuation of one may cause a corresponding actuation of the other. For example, the seat pan 106 may be coupled to the seatback 104 via one or more pivot joints. For instance, the seatback 104 may be configured to rotate about an axis through a pivot joint coupling the seatback 104 and the seat pan 106 during actuation between the upright position and the lie-flat or bed position.

The aircraft seat 102 may include a seat frame. The seat frame may include, but is not limited to, a seatback frame, a seat pan frame, and a base assembly.

One or more of the seatback frame and/or the seat pan frame may be directly coupled, or indirectly coupled via one or more interconnecting components, to one or more components of the seat frame. At least a portion of the shroud (e.g., the bucket shroud section of the shroud) may be configured to cover the seat pan frame.

The aircraft seat 102 (e.g., the base 110, as illustrated in FIG. 1A-1E) may include a base assembly. The base assembly may include one or more base rails (e.g., tubes, bars, or the like). For example, the one or more base rails may be positioned relative to a particular direction of travel of the aircraft seat 102 including, but not limited to, perpendicular (e.g., cross-wise), parallel (e.g., cross-wise), or the like. For instance, the one or more base rails may be positioned relative to a same or a different direction of travel of the aircraft seat 102.

The base assembly may include one or more base brackets. For example, the one or more base rails may be coupled together via the one or more base brackets. For example, a base bracket may couple together the base rail and an adjacent base rail at any angle, such that the base assembly may include an outline of any geometric shape known in the art. For instance, the outline may be rectangular or substantially rectangular. Therefore, the above description should not be interpreted as a limitation on the present disclosure but merely an illustration.

The one or more base brackets may be coupled to a set of floor tracks of the aircraft cabin 100 via one or more floor fittings. At least a portion of the shroud (e.g., the base shroud section of the shroud) may be configured to cover the base assembly.

Figure 1B:
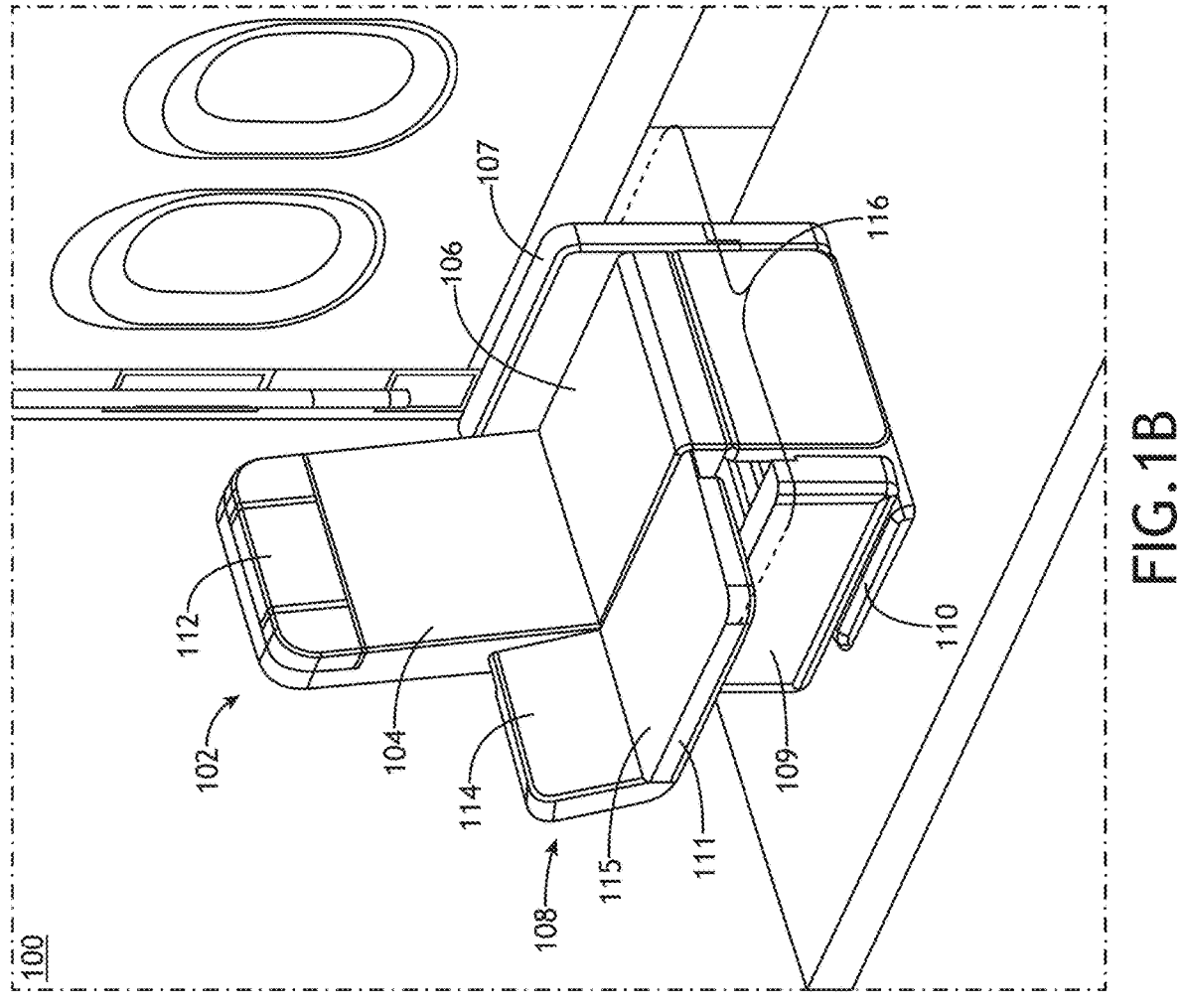
FIG. 1B illustrates a simplified schematic of the aircraft seat including the one or more deployable armrest assemblies in a deployed position and the stowed position, in accordance with one or more embodiments of the present disclosure.
Figure 1C:
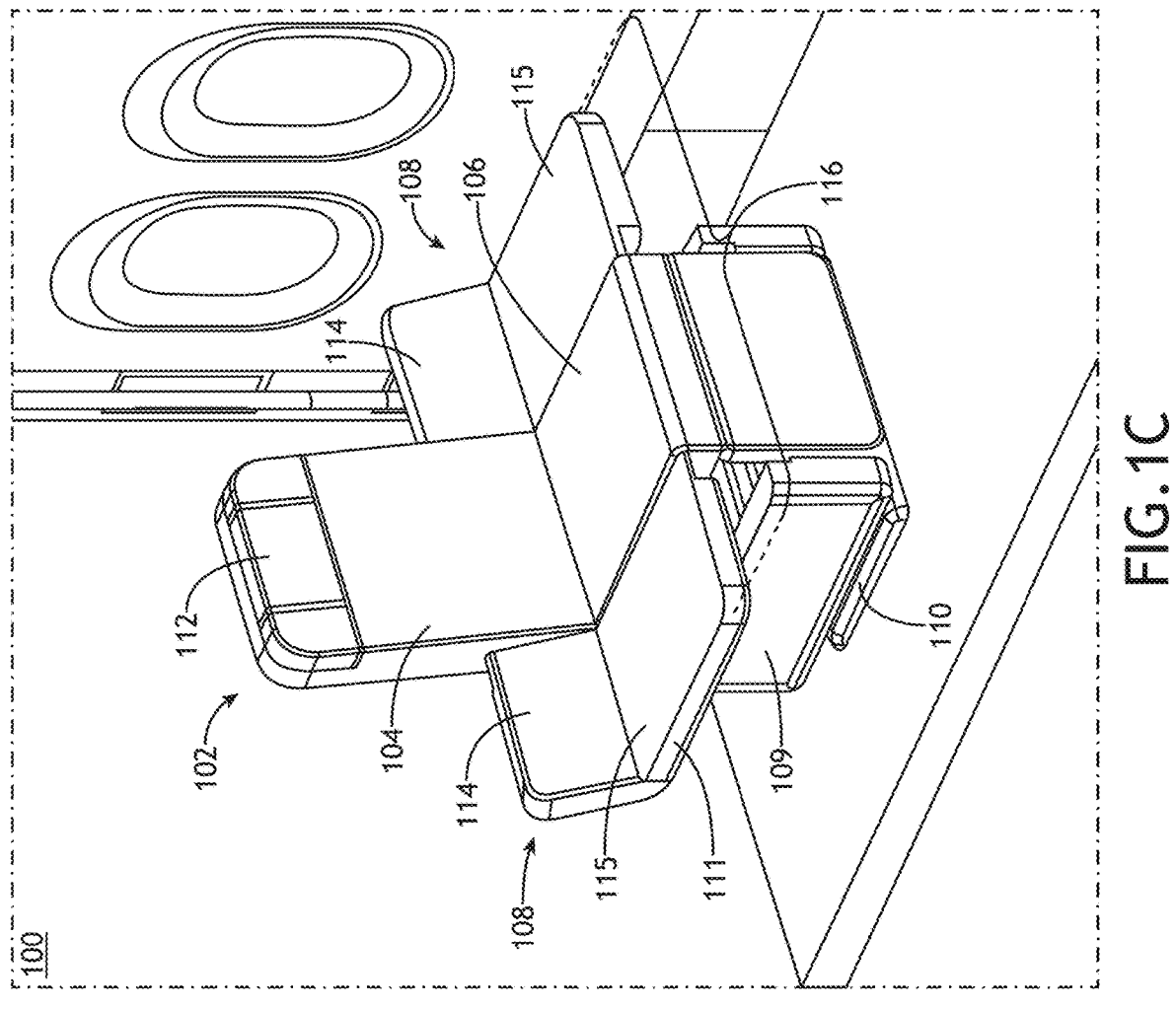
FIG. 1C illustrates a simplified schematic of the aircraft seat including the one or more deployable armrest assemblies in the deployed position, in accordance with one or more embodiments of the present disclosure.

Referring to FIGS. 1B-1C, the aircraft seat 102 may include the one or more deployable armrest assemblies 108. In embodiments, as shown in FIG. 1B, the aircraft seat 102 may include a single deployable armrest assembly 108. For instance, the deployable armrest assembly 108 may be coupled to a side of the seat pan 106. In one instance, the deployable armrest assembly 108 may be coupled to a right side of the seat pan 106. In another instance, the deployable armrest assembly 108 may be coupled to a left side of the seat pan 106.

In embodiments, as shown in FIG. 1C, the aircraft seat 102 may include a plurality of deployable armrest assemblies 108. For example, the plurality of deployable armrest assemblies 108 may include a first deployable armrest assembly 108 and an additional deployable armrest assembly 108. In one instance, the first deployable armrest assembly 108 may be coupled to a first side of the seat pan 106 and the additional deployable armrest assembly 108 may be coupled to an additional side of the seat pan 115. In this regard, as shown in FIG. 1C, the first deployable armrest assembly 108 may be coupled to the right side of the seat pan 106 and the additional deployable armrest assembly 108 may be coupled to the left side of the seat pan 106.

In embodiments, the deployable armrest assembly 108 may be configured to actuate between one or more positions, as will be discussed further herein. For example, the deployable armrest assembly 108 may be configured to actuate between one of a stowed position and a deployed position, and vice versa. In one instance, when the deployable armrest assembly 108 is in the stowed position (e.g., the position of the deployable armrest assemblies 108 as shown in FIG. 1A), the deployable armrest assembly 108 may provide the passenger with an armrest (i.e., a place for the passenger to rest their arm). In another instance, when the deployable armrest assembly 108 is in the deployed position (e.g., the position of the deployable armrest assemblies 108 as shown in FIG. 1C), the deployable armrest assembly 108 may act as an auxiliary seat pan 115 to form a wide seating area 116 (or wide seating surface). The wide seating area 116 may be configured to seat one or more passengers. For example, the primary seat section (e.g., seatback 104, seat pan 106) may be configured to seat a passenger occupying the aircraft passenger compartment suite. By way of another example, the auxiliary section seat (e.g., auxiliary seatback portion 114, auxiliary seat pan 115) may be configured to seat a guest passenger when the aircraft seat 102 is in the upright position. Further, the wide seating area 116 may provide an area to be used as a surface for the passenger's belongings or provide increased width for portions of a passenger's body.

The auxiliary seat pan 115 may be substantially flush (substantially parallel, e.g., sit level at the say height) with the primary seat pan 106, such that the auxiliary seat pan 115 and the seat pan 106 may form a substantially flush, continuous bench surface, or wide seating area 116.

It is noted that the actuation of the auxiliary section may be independent of the actuation of the primary section.

It is noted that the increased width of the aircraft seat 102 may provide for the aircraft passenger compartment suite to be used as a shared social environment in addition to usage by the passenger occupying the aircraft passenger compartment suite.

Figure 1D:
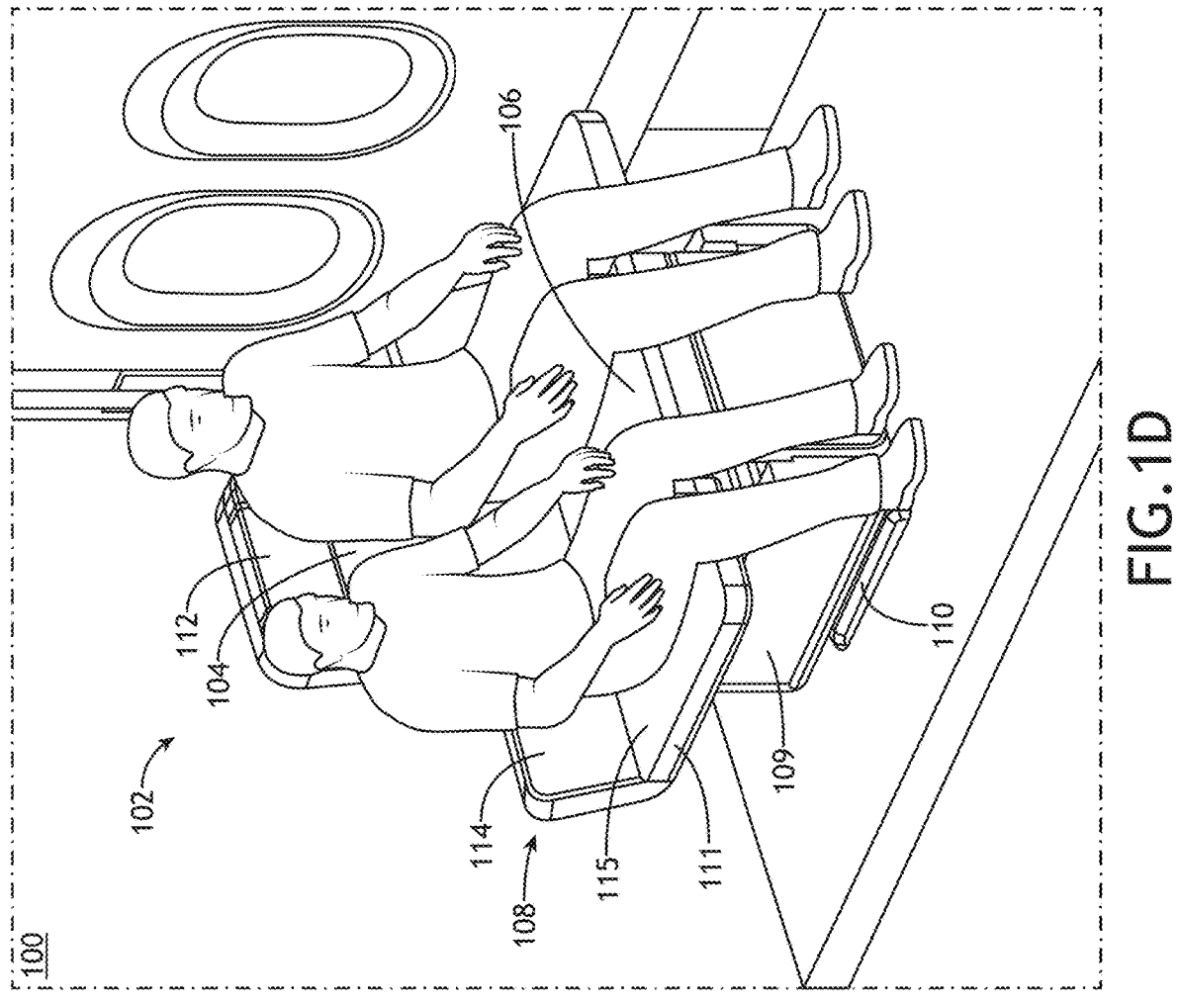
FIG. 1D illustrates the aircraft seat as shown in FIG. 1C with a bench surface of the deployable armrest assembly being used as a companion seat and another bench surface being used to increase the aircraft seat size for the main passenger, in accordance with one or more embodiments of the present disclosure.
Figure 1E:
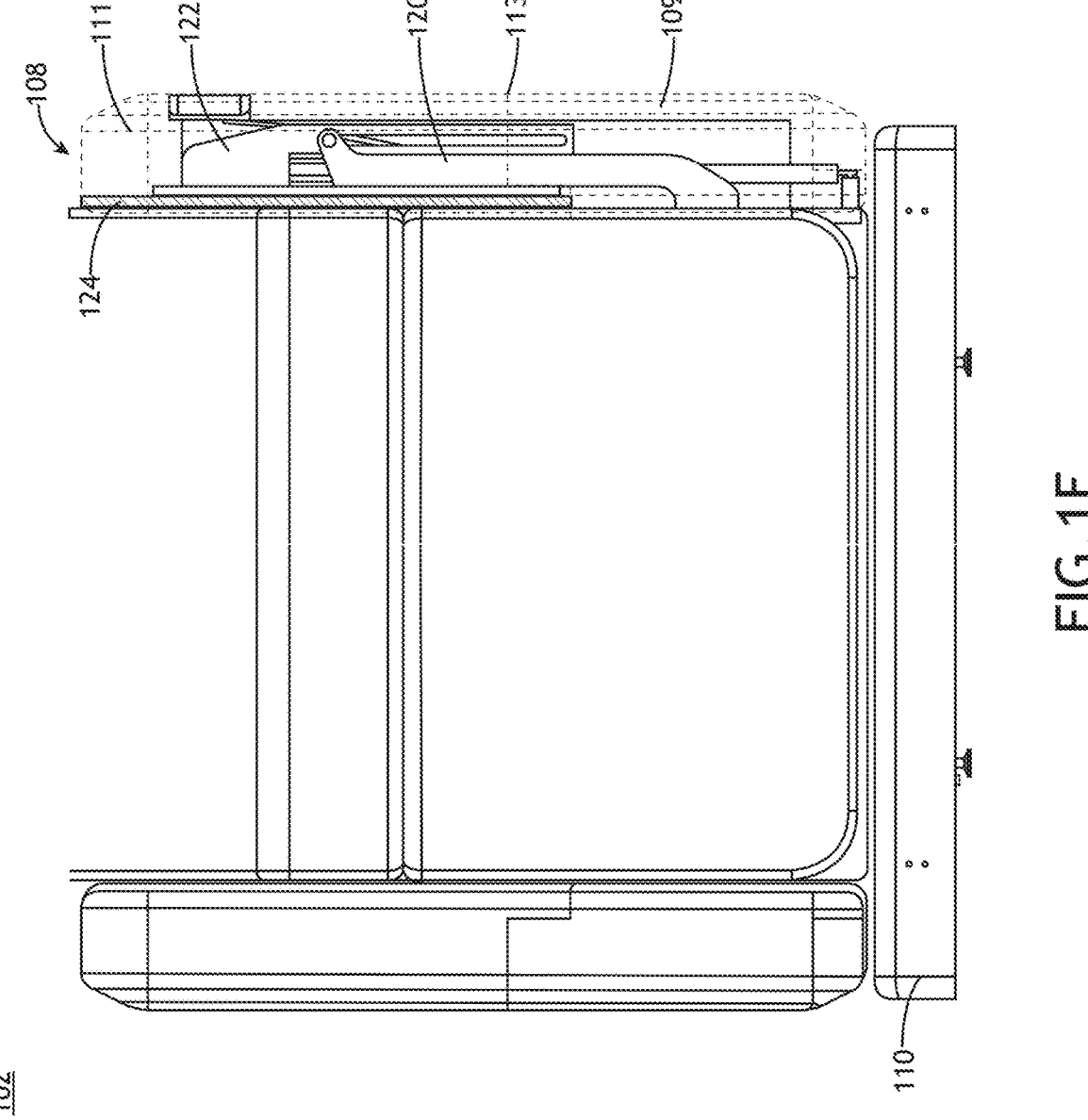
FIG. 1E illustrates a simplified front view schematic of an actuator sub-system of the aircraft seat of FIG. 1A, in accordance with one or more embodiments of the present disclosure.
Figure 1F:
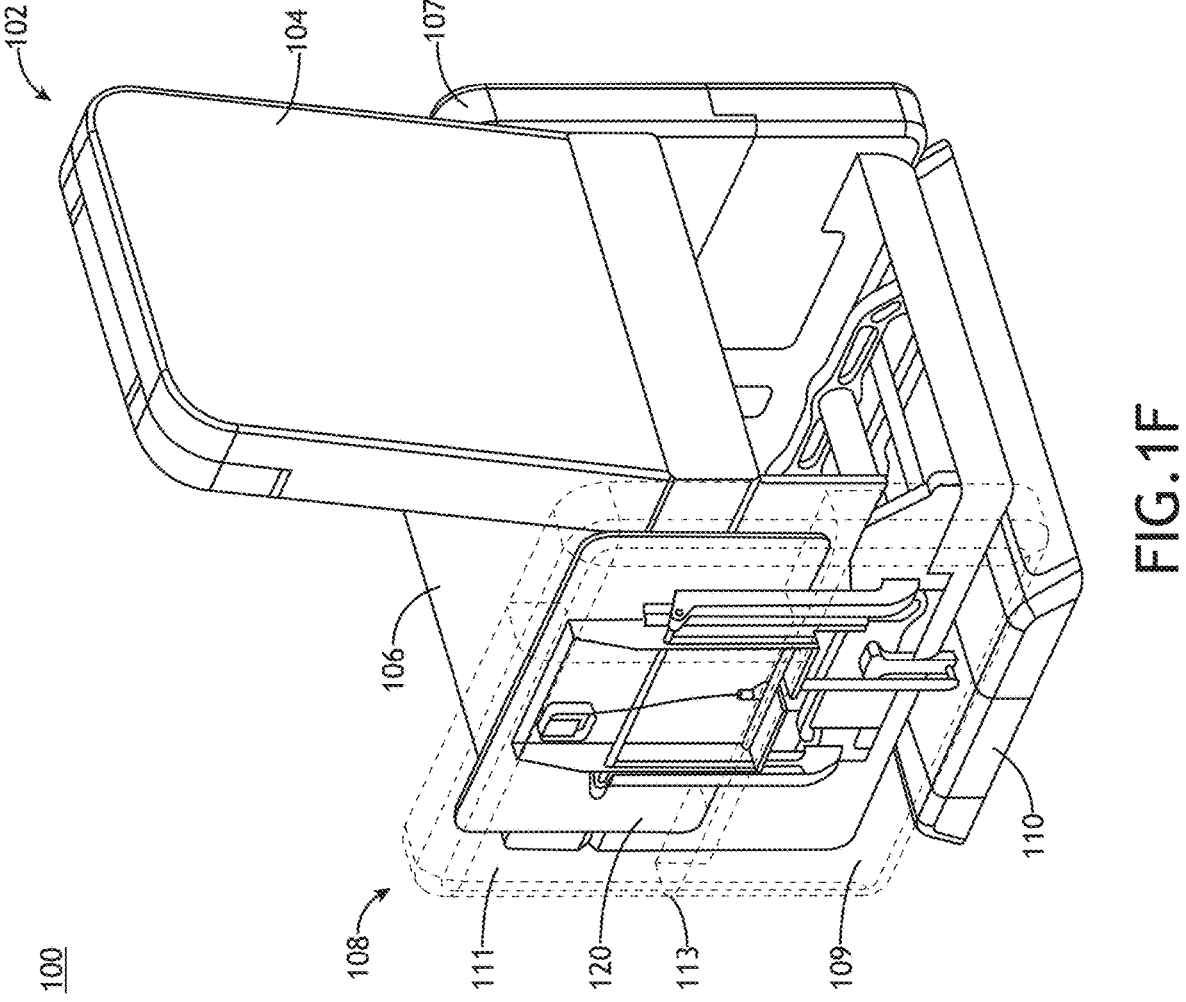
FIG. 1F illustrates a simplified side view schematic of the actuator sub-system, in accordance with one or more embodiments of the present disclosure.

Referring now to FIGS. 1E-1F, the deployable armrest assembly 108 may include a housing configured to house (or at least partially enclose) an armrest attaching panel 122 and an actuator sub-system 120. For example, the housing may include a stationary housing portion 109 and a deployable housing portion 111. In this regard, the stationary housing portion 109 and the deployable housing portion 111 may be configured to house (or at least partially enclose) the armrest attaching panel 122 and the actuator sub-system 120.

In embodiments, the deployable housing portion 111 may be configured actuate between one of a stowed position and a deployed position, and vice versa. The deployable housing portion 111 may consist of a similar or different material of the seat pan material (e.g., fabric, leather, or other material used for aircraft seating). In embodiments, the stationary housing portion 109 may be configured to remain in place (e.g., not actuate) when the deployable housing portion 111 actuates between the stowed position and deployed position.

In embodiments, the stationary housing portion 109 and the deployable housing portion 111 may be separated by a division line 113 (or divider line 113). For example, the deployable housing portion 111 may be arranged above the division line 113, such that the stationary housing portion 109 is arranged below the deployable housing portion 111. Although FIGS. 1E-1F depict the housing including a stationary housing portion 109 and a deployable housing portion 111, it is noted that the configuration shown (e.g., shape, size, arrangement, etc.) is provided merely for illustrative purposes and shall not be construed as limiting the scope of the present disclosure. For example, the housing may be formed of deployable housing portion 111 (without a stationary housing assembly 109). It is noted that the stationary housing portion 109 may be formed of any suitable material such as, but not limited to, a plastic housing, metal housing, or any material that may be suitable for use on an aircraft.

In embodiments, the armrest attaching panel 122 may include a cushion (or cushioning layer) to provide cushioning to the auxiliary seat pan 115 when the deployable armrest assembly 108 is in the deployed position. For example, the armrest attaching panel 122 may include one or more layers of foam 124 (or other suitable materials capable of providing cushioning). For instance, as shown in FIG. 1E, the one or more layers of foam 124 may be positioned between a surface of the seat frame and a surface of the armrest attaching panel 122 when in the stowed position.

Referring generally to FIGS. 2-4E, the deployable armrest assembly 108 may include an actuator sub-system 120.

Figure 2:
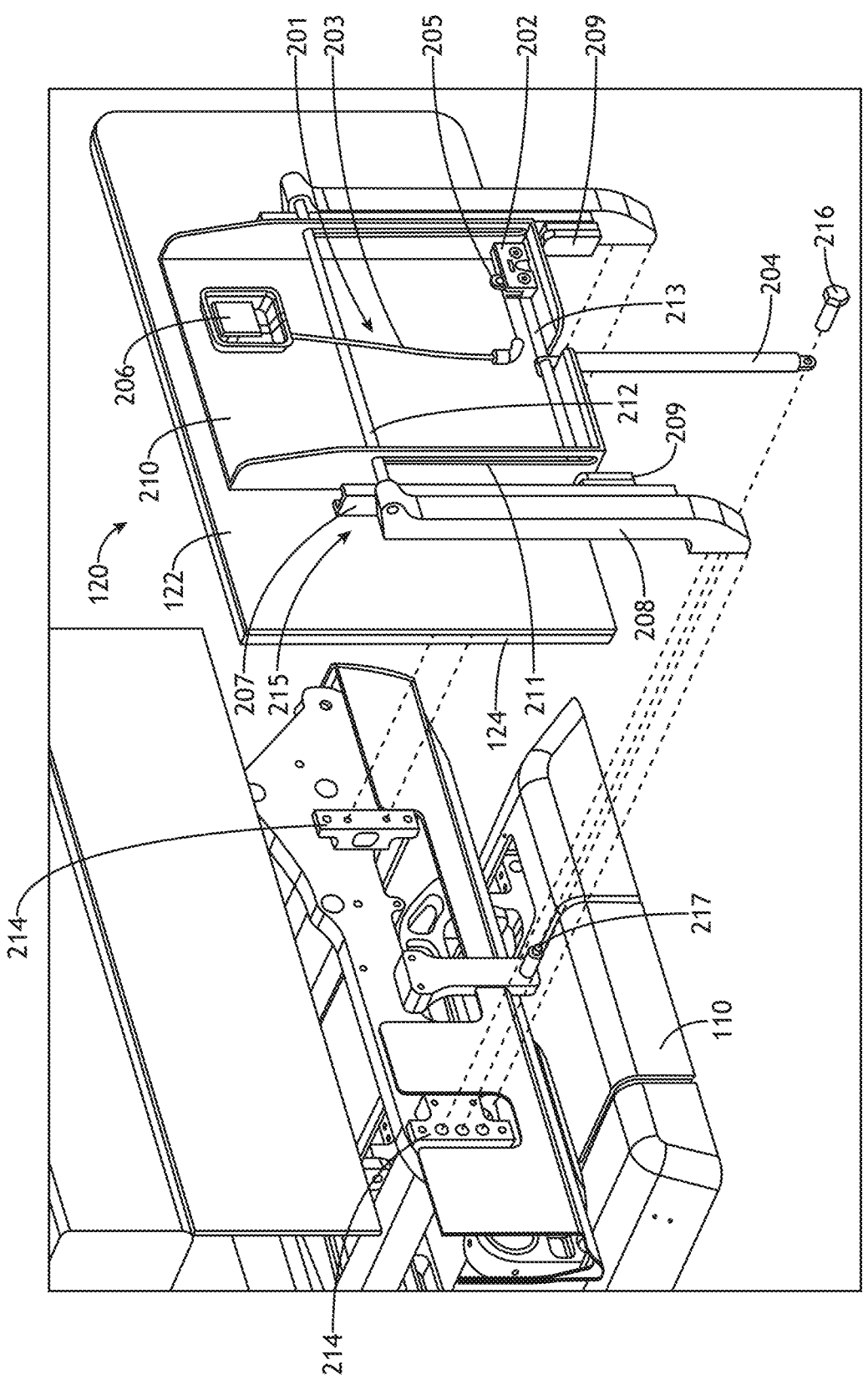
FIG. 2 illustrates a side view of a connection of the aircraft seat and the actuator sub-system, in accordance with one or more embodiments of the present disclosure.
Figure 3A:
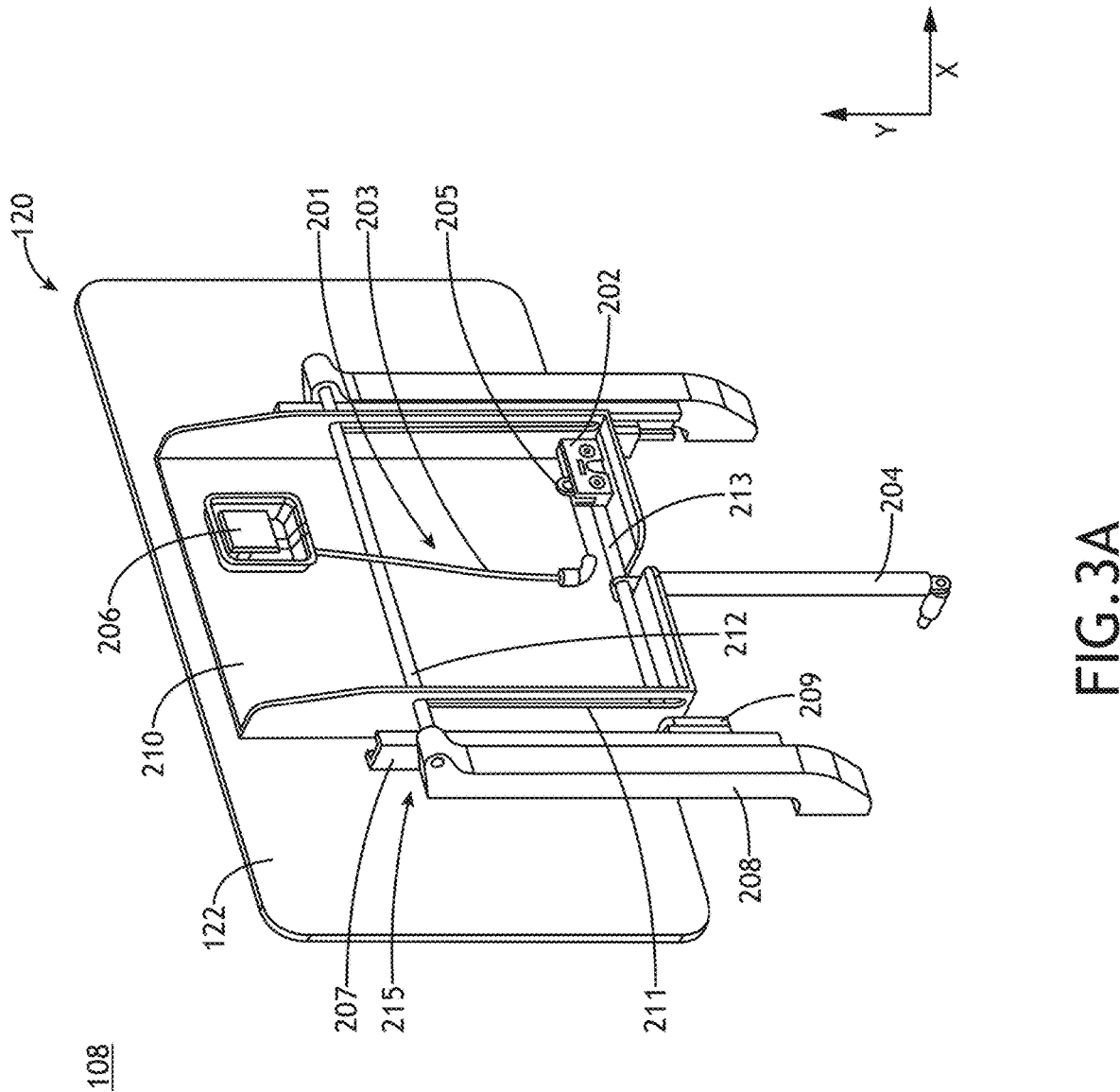
FIG. 3A illustrates a closer view of the actuator sub-system when the deployable armrest assembly is in the stowed position, in accordance with one or more embodiments of the present disclosure.
Figure 3B:
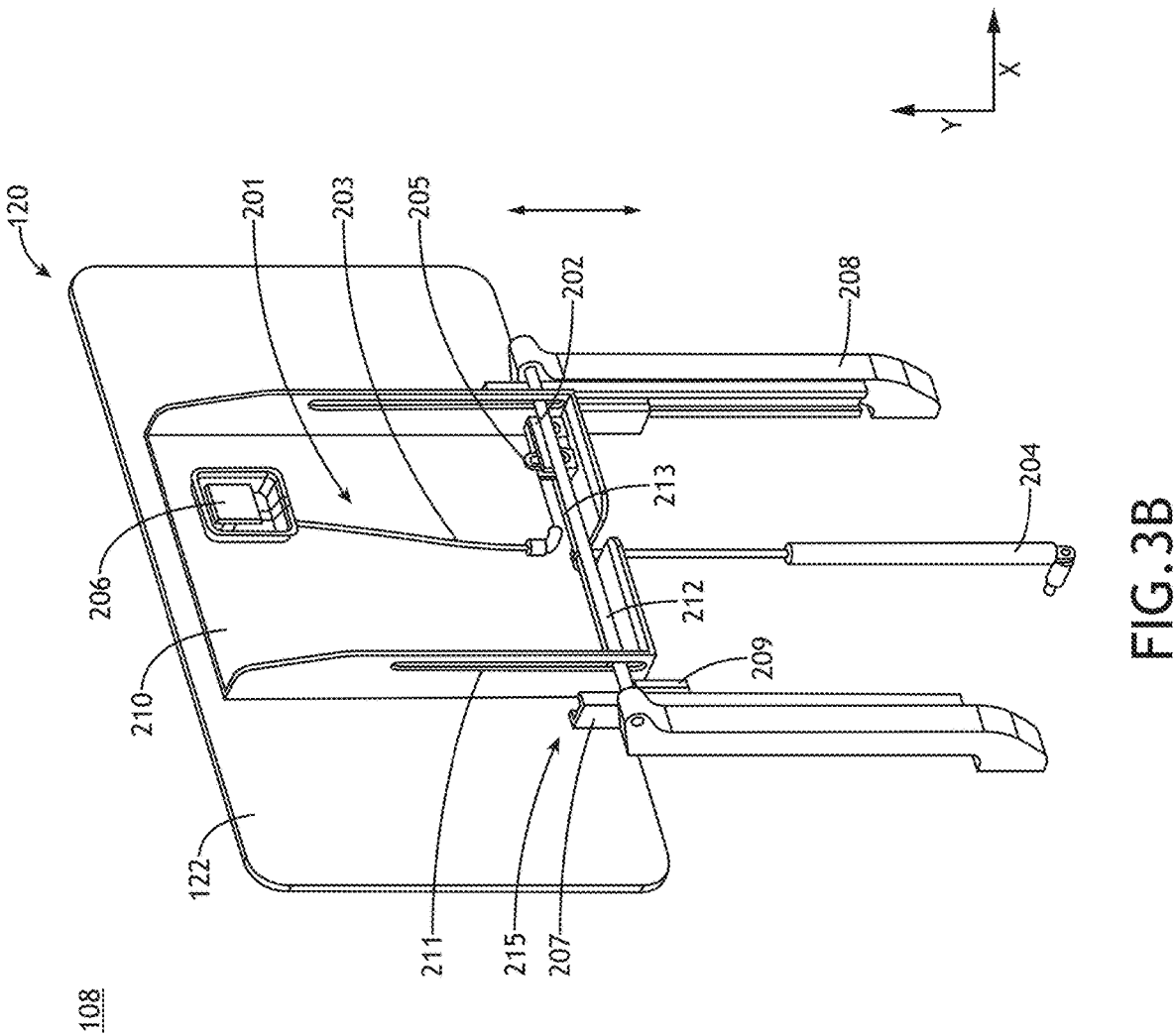
FIG. 3B illustrates a closer view of the actuator sub-system when the deployable armrest assembly transitions between the stowed position and deployed position, in accordance with one or more embodiments of the present disclosure.
Figure 3C:
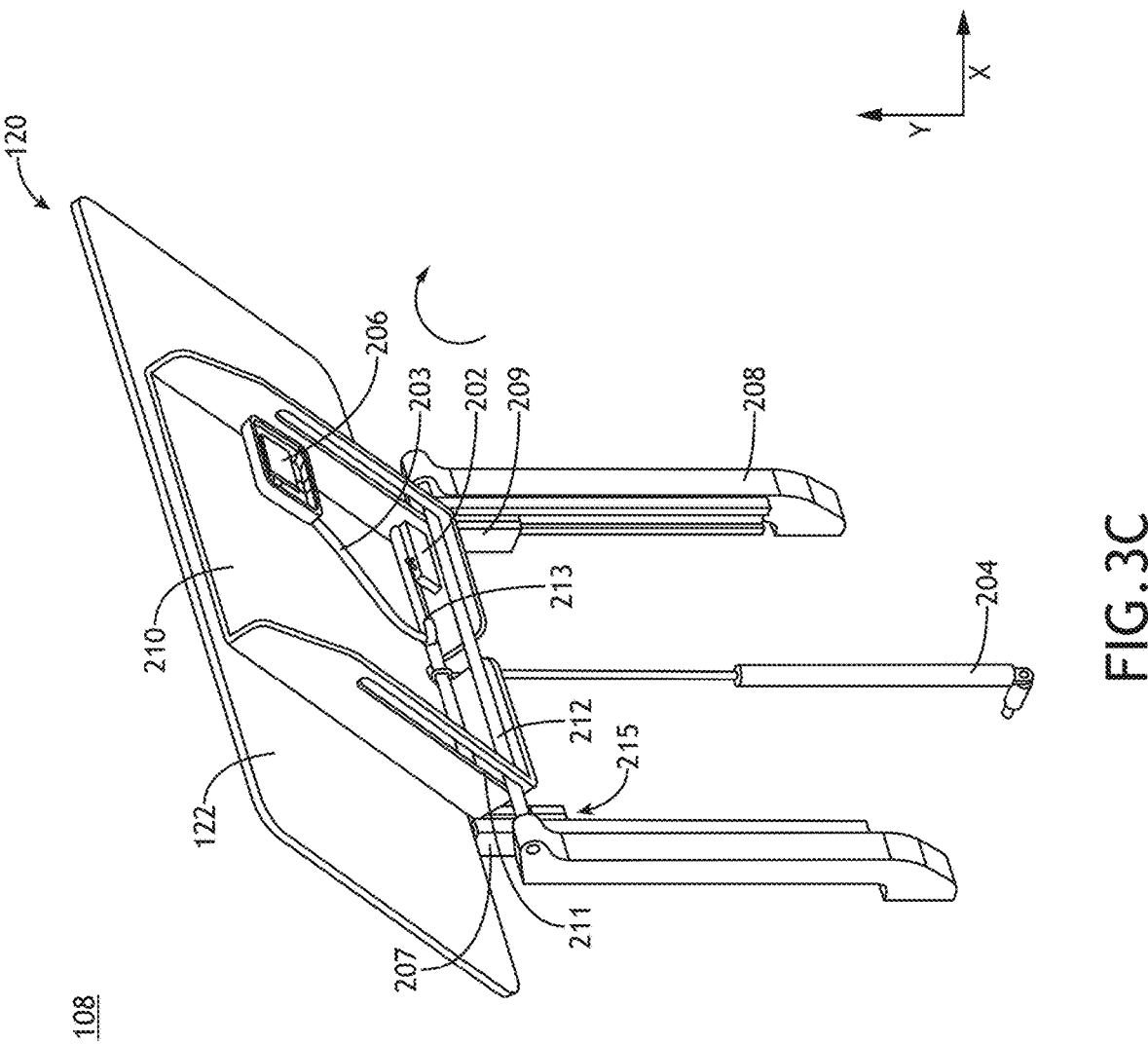
FIG. 3C illustrates a closer view of the actuator sub-system when the deployable armrest assembly is actuating between the stowed position and deployed position, in accordance with one or more embodiments of the present disclosure.
Figure 3D:
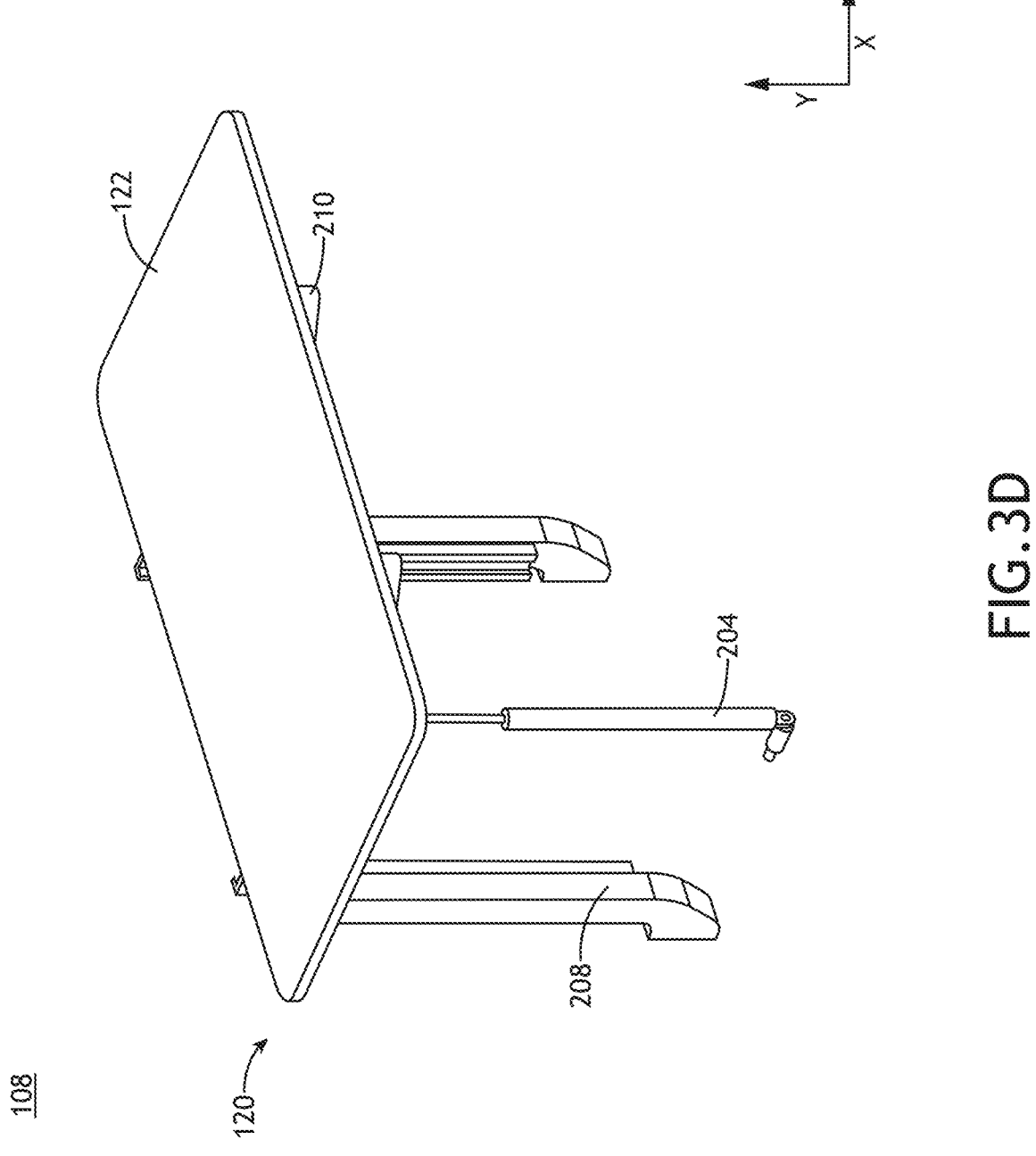
FIG. 3D illustrates a closer view of the actuator sub-system when the deployable armrest assembly is in the deployed position, in accordance with one or more embodiments of the present disclosure.

Referring to FIGS. 2-3D, the actuator sub-system 120 may include, but is not limited to, a locking assembly 201, an actuator 204, one or more brackets 208, a frame 210, a slot 211 within the frame 210, a rotation system (e.g., rod 212), a translation system 215, and the like.

The armrest attaching panel 122 may be coupled to the frame 210 of the actuator sub-system 120. For example, the armrest attaching panel 122 may be coupled to the frame 210 of the actuator sub-system 120 to allow the armrest attaching panel 122 to actuate between one of the stowed position or deployed position. For instance, a top surface of the frame 210 may couple to a bottom (or rear) surface of the armrest attaching panel 122. It is noted that the armrest attaching panel 122 may be coupled to the frame 210 via any fastening mechanism such as, but not limited to, welded, adhesives, fasteners (e.g., screws, bolts, etc.), and the like. In some embodiments, the armrest attaching panel 122 and the frame 210 may be integrated together (e.g., a single piece).

Referring generally to FIG. 2, the actuator sub-system 120 may include the one or more brackets 208 configured to attach the one or more deployable armrest assemblies 108 to the aircraft seat 102 via one or more base brackets 214. For example, as shown in FIG. 1B, when the aircraft seat 102 includes a single deployable armrest assembly 108, the one or more brackets 208 may be attached to at least one base bracket 214 positioned on a side of the aircraft seat 102. In one instance, the one or more brackets 208 may be coupled to the right side of the aircraft. In another instance, the one or more brackets 208 may be coupled to the left side of the aircraft.

By way of another example, as shown in FIGS. 1C-1D, when the aircraft seat 102 includes a plurality of deployable armrest assemblies 108, the one or more brackets 208 of the first deployable armrest assembly may be coupled to at least one base bracket 214 on a first side of the aircraft seat 102 and the one or more brackets 208 of the additional deployable armrest assembly 108 may be coupled to an additional side of the aircraft seat 102. In this regard, the first deployable armrest assembly 108 may be coupled to the right side of the seat pan 106 and the additional deployable armrest assembly 108 may be coupled to the left side of the seat pan 106, and vice versa.

Although FIG. 2 depicts the one or more base brackets 214 of the aircraft seat 102 positioned on a side of the aircraft seat, it is noted that the one or more base brackets 214 of the aircraft seat 102 may be positioned in any configuration on the aircraft seat 102 suitable for coupling the one or more deployable armrest assemblies 108 to the aircraft seat 102 via the one or more brackets 208.

The actuator 204 may be configured to actuate the deployable armrest assembly 108 between one of the stowed position and the deployed position. It is noted that the deployable armrest assembly 108 may be positioned in one or more intermediate positions between the stowed position and the deployed position when actuating between one of the stowed position and the deployed positioned, and vice versa.

The actuator 204 may include any type of actuatable suitable for actuating the deployable armrest assembly 108 between one of the stowed position and the deployed position. For example, the actuator 204 may include, but is not limited to, one or more electro-mechanical actuators, gas spring actuators, linear/rotary actuators, or the like. For instance, as shown in FIGS. 3A-3D, the actuator 204 may include a gas spring actuator 204. Although FIGS. 3A-3D depict a specific actuator sub-system configuration, it is noted that the actuator 204 may be configured in any manner suitable for actuating the deployable armrest assembly, as such FIGS. 3A-3D are provided merely for illustrative purposes and shall not be construed as limiting the scope of the present disclosure.

In embodiments, as shown in FIG. 2, the actuator 204 may be configured to couple to a portion of the aircraft seat 102 via one or more fastening mechanisms. For example, a first end of the actuator 204 may be coupled to the aircraft seat 102 via one or more fasteners 216 such as, but not limited to, one or more bolts, one or more screws, or the like. For instance, the first end of the actuator 204 may include an opening configured to receive the fastener 215 (e.g., bolt 216), where the bolt 216 may couple to a surface 217 of the aircraft seat 102.

In embodiments, as shown in FIG. 2, the actuator 204 may be coupled to the frame 210 via a rod 213 within the frame 210. For example, an additional end of the actuator 204 (opposite the first end) may include an opening configured to receive a portion of a shaft of the rod 213, where the rod 213 may be coupled to the frame 210.

The locking assembly 201 may have a locked state to prevent the actuator sub-system 120 from actuating (e.g., remaining in the stowed position). For example, the locking assembly 201 may prevent the deployable armrest assembly 108 from actuating during certain aircraft events (e.g., take-off, landing, or taxi) when the deployable armrest assembly should be kept in the stowed position. By way of another example, the locking assembly 201 may have an unlocked state to allow the actuator sub-system 120 to actuate (e.g., deploying the actuator sub-system 120).

The locking assembly 201 may include, but is not limited to, a latch 202, a release cable 203, a release lever 205, release mechanism 206, and the like.

The latch 202 may be coupled to the frame 210. For example, the latch 202 may include a rotary latch 202. The latch may include a mechanism, such as a release lever 205, that may move the latch form a locked state to an unlocked state.

The release cable 203 may be configured to unlock the latch 202. For example, the release mechanism 206 (e.g., control button, or the like) may be configured to pull the release cable 203 to cause the release lever 205 to unlock the latch 202. In this regard, the latch 202 may change from a locked state to an unlocked state by a user (e.g., the main passenger) engaging the release mechanism 206. For example, during non-TTL stages of the flight, the main passenger may engage (e.g., press, pull, and/or activate) the release mechanism 206 to change the state of the latch 202 from the locked state to the unlocked state. In this regard, when the release mechanism 206 is engaged and the latch 202 is in the unlocked state, the deployable armrest assembly 108 may actuate from the stowed position to the deployed position.

The translation system 215 may include one or more tracking rails 207 and one or more carriages 209 configured to translate along a vertical axis of the tracking rails 207. For example, one or more tracking rails 207 may be coupled to the internal side of one or more brackets 208 (e.g., the side of the bracket 208 oriented towards the frame 210) and the one or more carriages 209 may be coupled to the frame 210. In this regard, the carriages 209 may rest within the tracking rail 207 and be configured to translate along the vertical axis of the tracking rail 207.

The rotation system may include a rod 212 having one or more ends, with each end coupled to a respective bracket 208. For example, the slot 211 of the frame 210 may be configured to receive a portion of the shaft of the rod 212. For instance, as will be discussed further herein, a portion of the shaft of the rod 212 may rotate within the slot 211 of the frame 210.

Once the locking assembly 201 is in the unlocked state, the actuator 204 may apply force (e.g., a restoring force from a spring) to the frame 210. In embodiments, the actuator 204 may apply force to the frame 210 vertically along the translation system 215. The frame 210 may translate vertically, until the rod 212 comes in contact with the end of the slots 211 of the frame 210, as illustrated in 3B. As illustrated in FIG. 3C, the frame 210 may then pivot horizontally around the rod 212. The frame 210 may pivot horizontally approximately 90° until the frame is sustainably parallel to the aircraft floor in the deployed position (e.g., the deployable housing portion 111 sitting flush with the seat pan 106).

Figure 5:
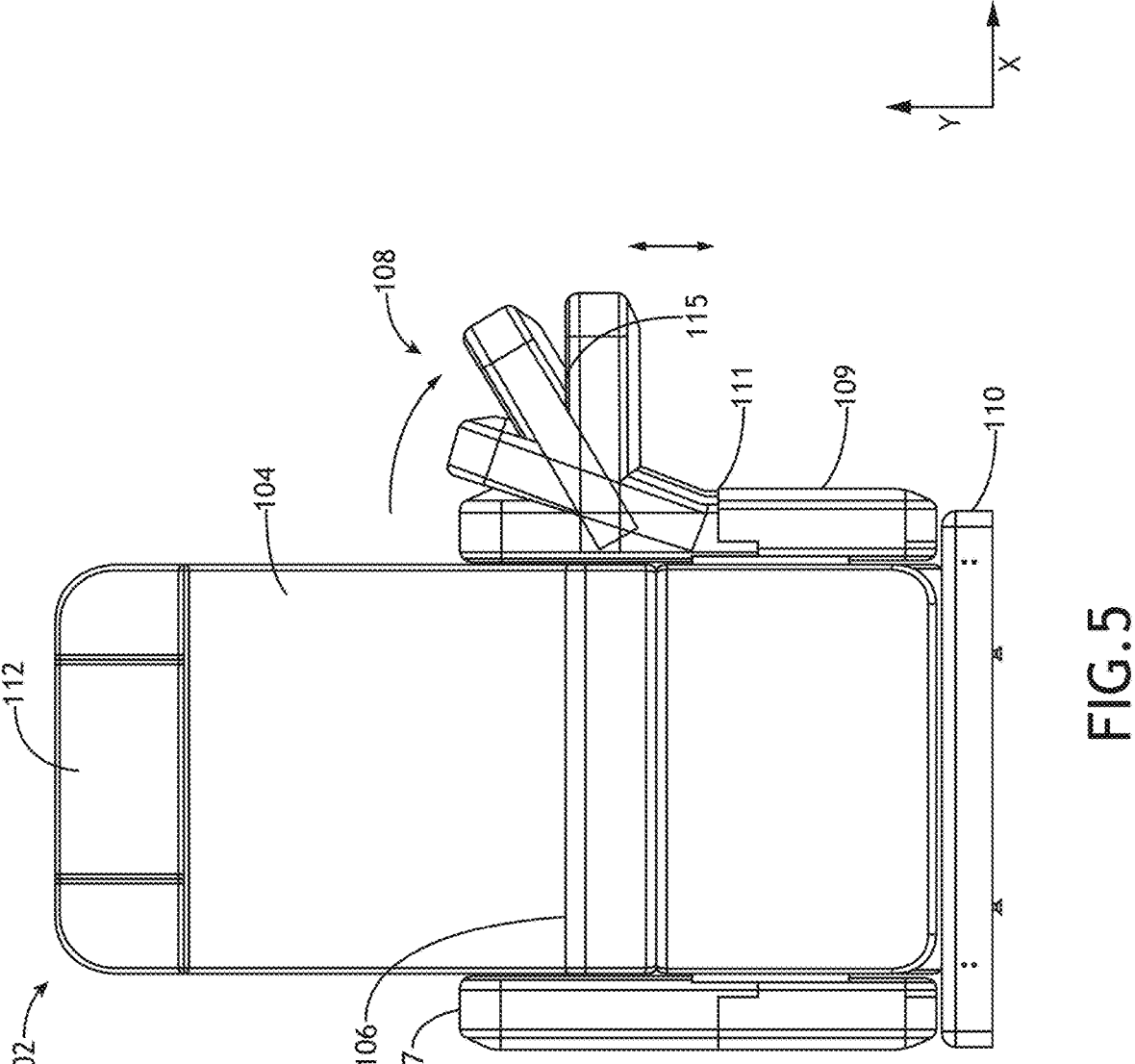
FIG. 5 illustrates a simplified front view of an aircraft seat including a deployable armrest assembly actuating between the stowed position and the deployable position, in accordance with one or more embodiments of the present disclosure.

In embodiments, when the locking assembly 201 is in the unlocked state, the frame 210 may pivot horizontally approximately 90° and then translate vertically until reaching the deployed position (e.g., the deployable armrest assembly sitting flush with the seat pan 106). By way of another example, as shown in FIG. 5, the frame 210 may simultaneously pivot horizontally and translate vertically until reaching the deployed position.

Figure 4A:
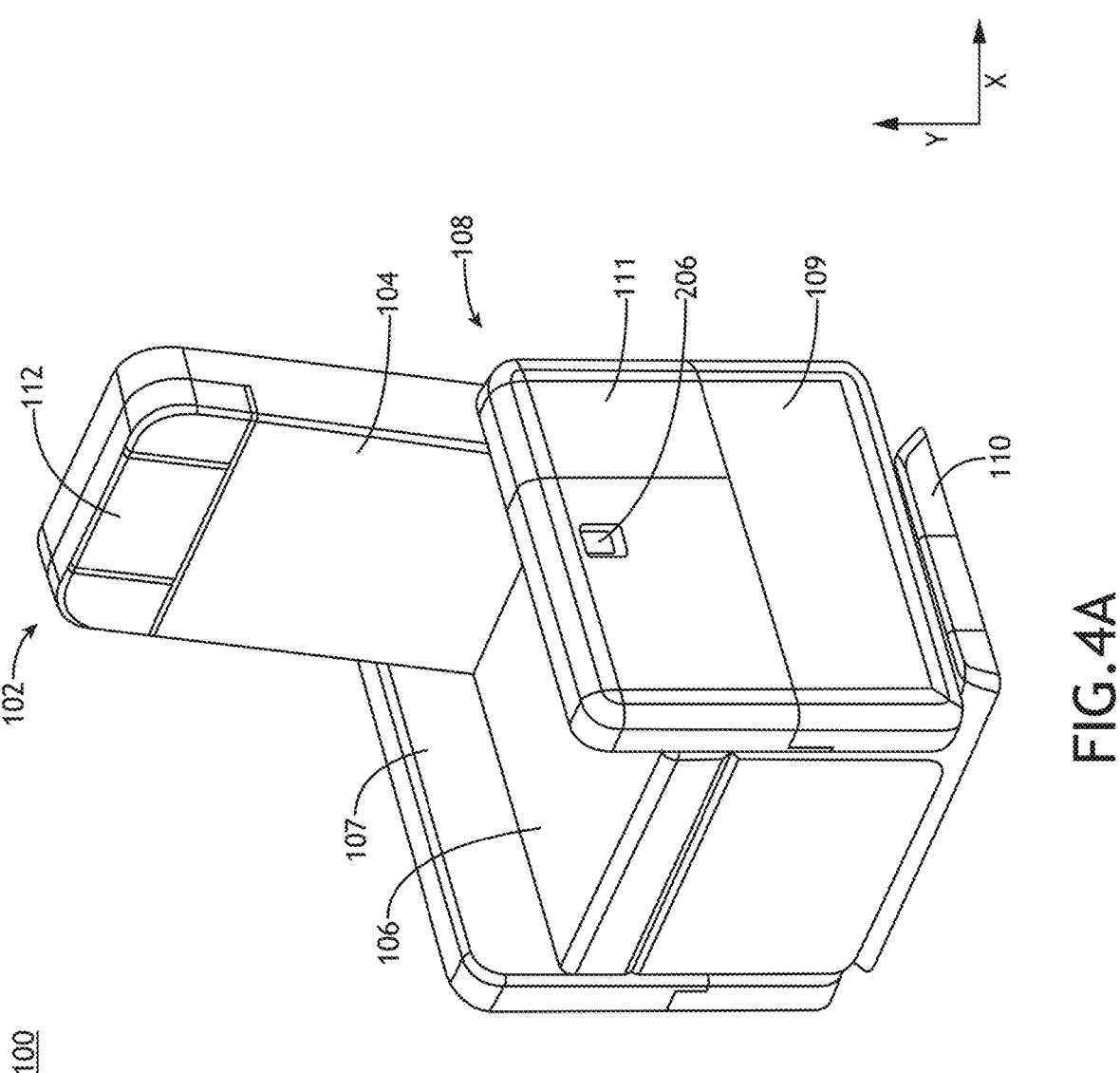
FIG. 4A illustrates a simplified side of an aircraft seat include a deployable armrest assembly in the stowed position, in accordance with one or more embodiments of the present disclosure.
Figure 4B:
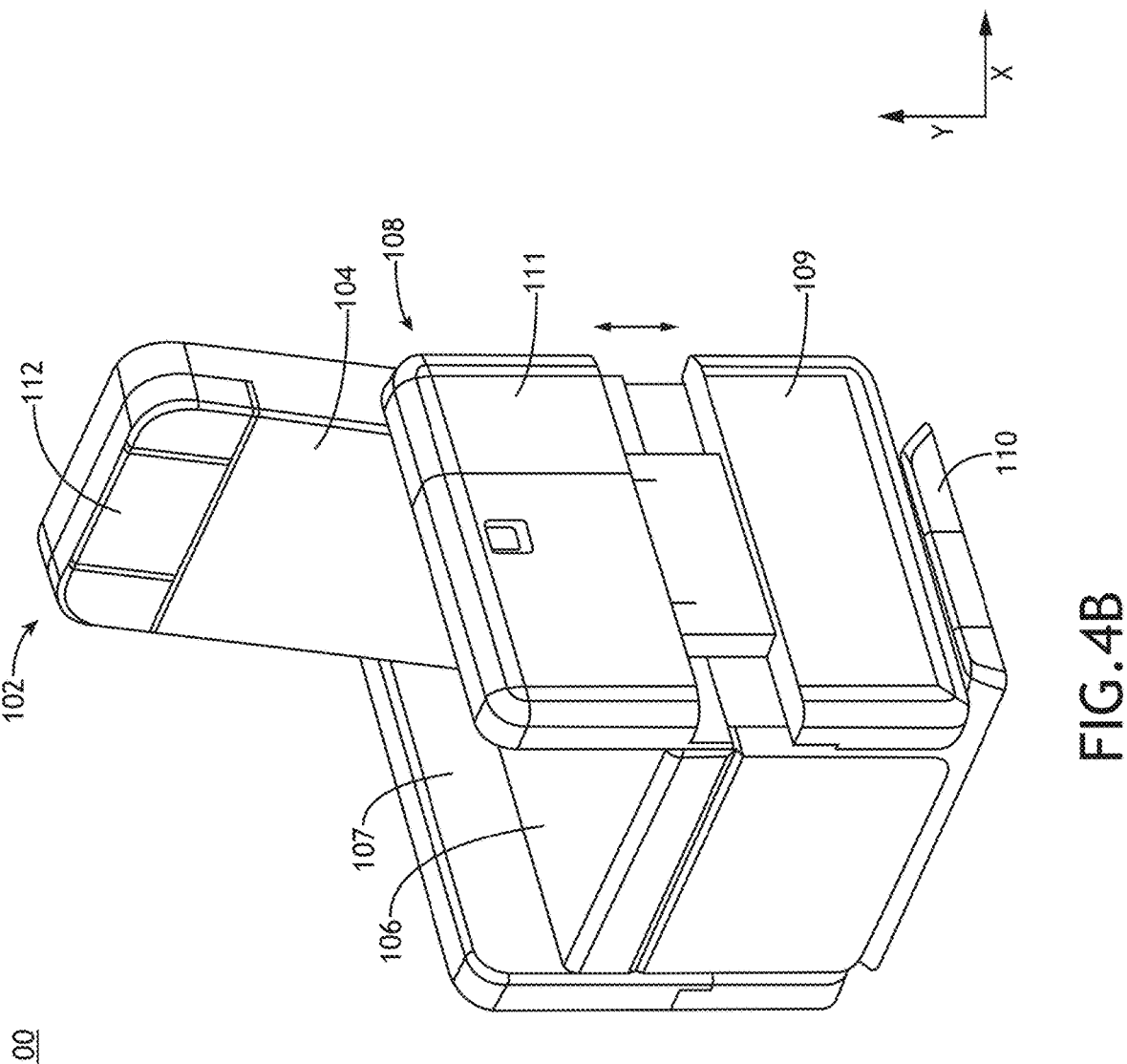
FIG. 4B illustrates a simplified side of an aircraft seat including the deployable armrest assembly in the position illustrated in FIG. 3B, in accordance with one or more embodiments of the present disclosure.
Figure 4C:
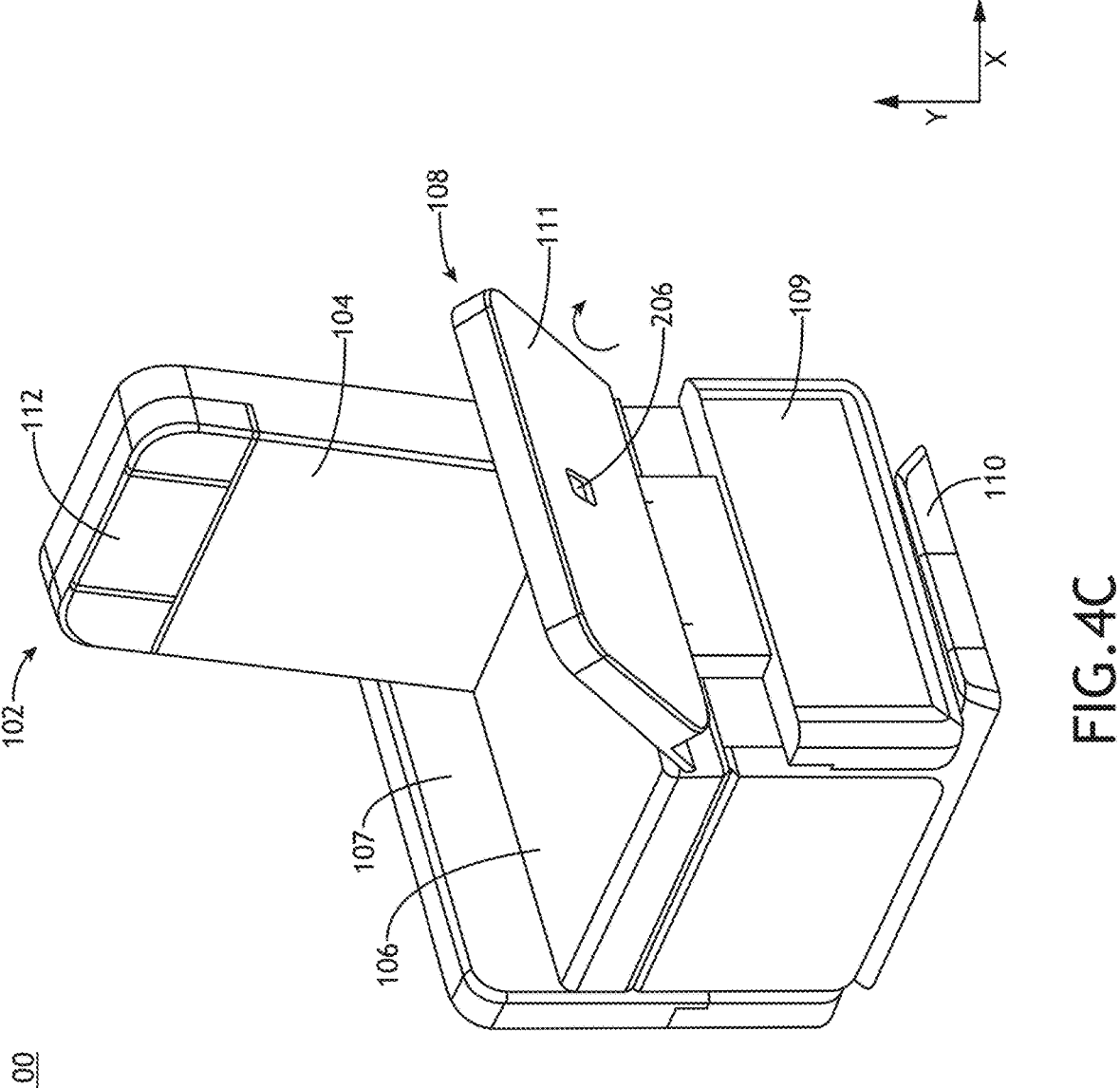
FIG. 4C illustrates a simplified side of an aircraft seat including a deployable armrest assembly in the position illustrated in FIG. 3C, in accordance with one or more embodiments of the present disclosure.
Figure 4D:
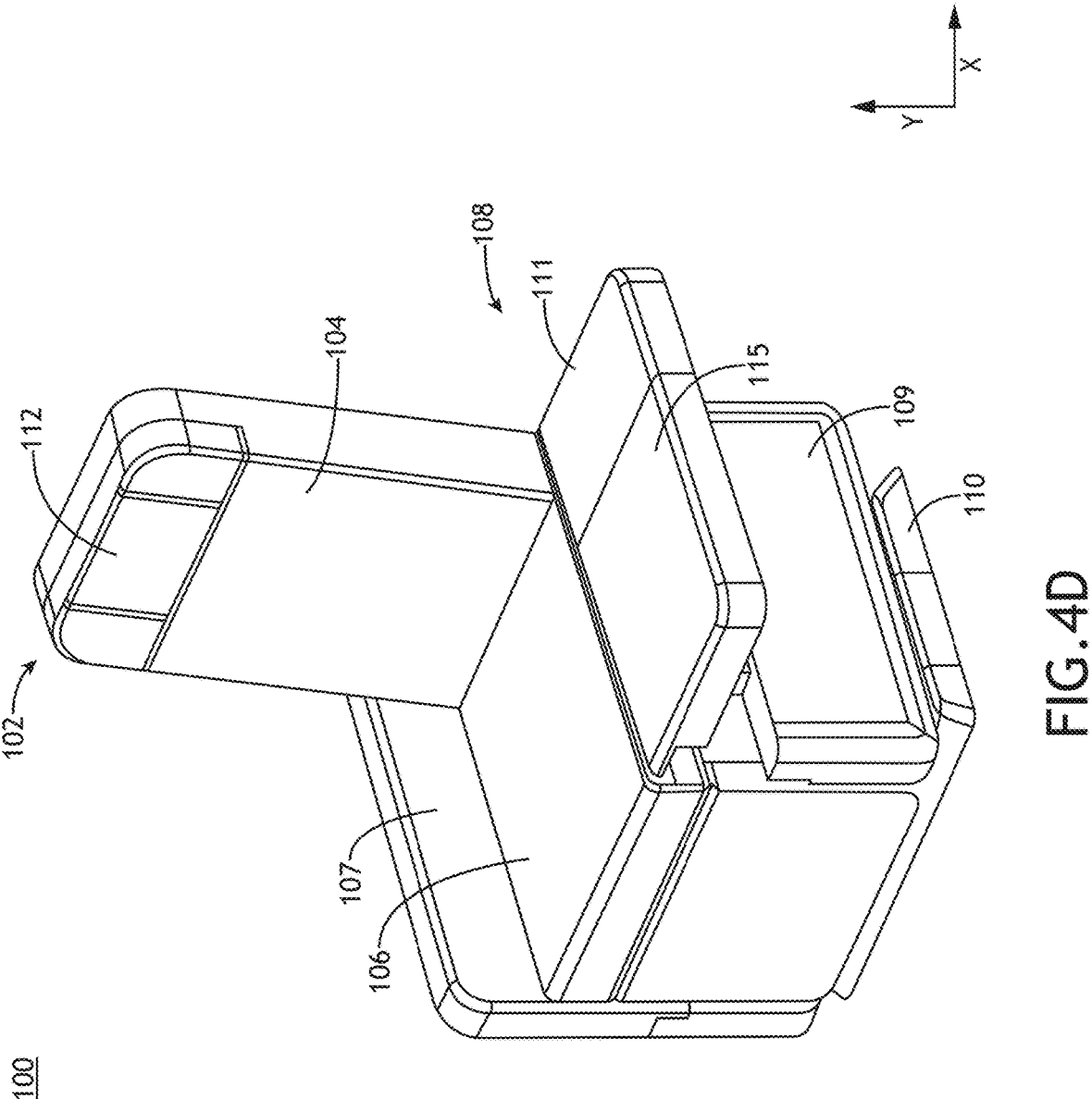
FIG. 4D illustrates a simplified view of an aircraft seat including a deployable armrest assembly in the deployed position, in accordance with one or more embodiments of the present disclosure.
Figure 4E:
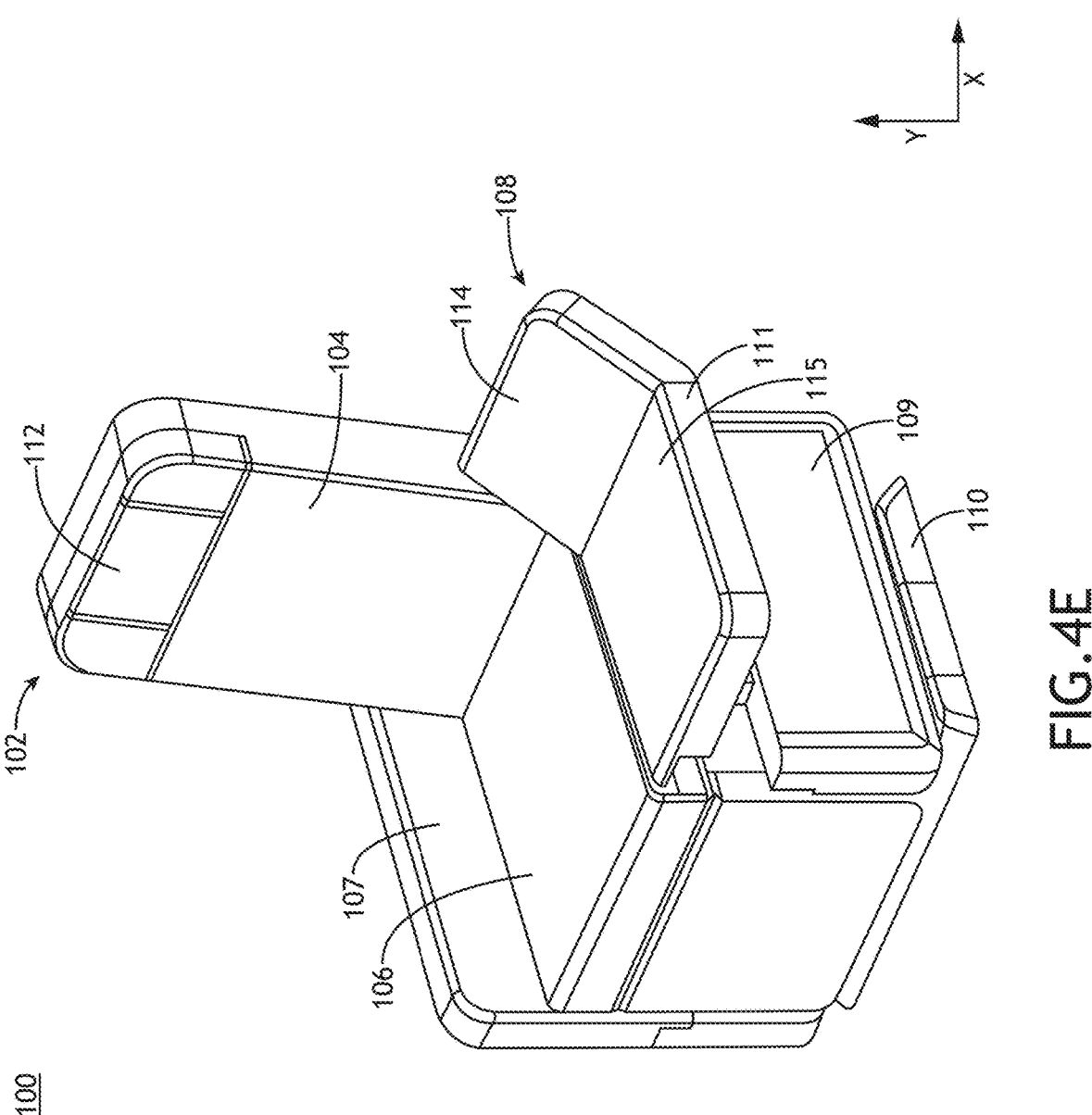
FIG. 4E illustrates a simplified view of the aircraft seat of FIG. 4D including a backrest surface on the bench surface, in accordance with one or more embodiments of the present disclosure.

Now referring to FIGS. 4A-E, FIGS. 4A-E illustrate the aircraft seat during actuation of the deployable armrest assembly 108 from the stowed position to the deployed position. In embodiments, the frame 210 may be coupled to the armrest attaching panel 122 so as the frame 210 actuates, the armrest attaching panel may simultaneously actuate. As illustrated in FIG. 4B, for example, as the frame 210 translates along a vertical axis via the translation system 215, the armrest attaching panel 122 may simultaneously translate vertically. For example, as the rod 212 translates within the slot 211 of the frame via the translation system 215, the armrest attaching panel 122 may simultaneously translate along the vertical axis. As illustrated in FIG. 3C, the armrest attaching panel 122 may rotate about a pivot point of the rod 212 until the armrest attaching panel 122 is substantially flush with the seat pan 106, such that the armrest attaching panel 122 is in a substantially horizontal position. For example, the frame 210 may rotate within the slot 211 of the frame 210 about a pivot point of the rod 212. For instance, the frame 210 may rotate approximately 90 degrees within the slot 211 of the frame 210 about the shaft of the rod 212 until the armrest attaching panel 122 is positioned in the deployed position and sits substantially flush with the seat pan 106 to form the wide seating area 116.

In embodiments, when actuating from the deployed position to the stowed position, the armrest attaching panel 122 may pivot about the pivot point in horizontal direction until the orientation of the armrest attaching panel 122 is vertical. The armrest attaching panel 122 may then translate down the vertical axis until reaching the stowed position.

In some embodiments, the deployable armrest assembly 108 may include an auxiliary seatback portion 114. For example, the auxiliary seatback portion 114 may be configured to actuate between one of a horizontal position to an upright position. In this regard, the auxiliary seatback portion 114 to be used by a companion when the auxiliary seat pan 115 is in the deployed position and being used as a buddy seat.

In embodiments, when the deployable armrest assembly 108 is in the deployed position, the auxiliary seatback portion 114 may pivot forward a certain degree determined by the design of the deployable armrest assembly 108, around a pivot point across the auxiliary seat pan 115.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft seat, the aircraft seat comprising:
   a primary seating section, the primary seating section including a primary seat pan coupled to a seat pan cushion and a primary seatback coupled to a seatback cushion; and
   one or more deployable armrest assemblies, each deployable armrest assembly configured to actuate between one of a stowed position and a deployed position, each deployable armrest assembly comprising:
   an actuator sub-system, the actuator sub-system comprising:
   a locking assembly having a locked state and an unlocked state; and
   an actuator configured to actuate the deployable armrest assembly between one of the stowed position and the deployed position;
   an armrest attaching panel coupled to the actuator sub-system; and
   a translation system and a rotation system coupled to a frame, wherein the rotational system includes a rotational rod coupled to an end of the actuator, wherein the frame includes a slot configured to receive a shaft of the rotational rod, wherein the actuator causes the frame to translate vertically along the translation system and to pivot horizontally about an axis of the shaft of the rotational rod within the slot,
   when the one or more deployable armrest assemblies are positioned in the deployed position, the one or more deployable armrest assemblies form an auxiliary seating section arranged proximate to the primary seating section, wherein the armrest attaching panel is configured as an auxiliary seat pan when the one or more deployable armrest assemblies form the auxiliary seating section,
   when the locking assembly of the actuator sub-system is in the unlocked state, the actuator of the actuator sub-system is configured to actuate the one or more deployable armrest assemblies to the deployed position,
   wherein the auxiliary seat pan and the primary seat pan form one or more wide seating surfaces when in the deployed position,
   wherein a top surface of the auxiliary seat pan is substantially flush with a top surface of the primary seat pan cushion of the primary seating section.

2. The aircraft seat of claim 1, wherein each deployable armrest assembly further comprises:
   an auxiliary seatback, wherein the auxiliary seatback is configured to actuate forward about a pivot point.

3. The aircraft seat of claim 1, wherein the armrest attaching panel further comprises a layer of foam coupled to a top surface of the armrest attaching panel.

4. The aircraft seat of claim 1, wherein the primary seating section further comprises:
   a base assembly couplable to a floor of an aircraft cabin, wherein the base assembly includes one or more base brackets,
   wherein the one or more deployable armrest assemblies are coupled to the one or more base brackets via one or more brackets coupled to the actuator sub-system.

5. The aircraft seat of claim 4, wherein the one or more deployable armrest assemblies includes a single deployable armrest assembly coupled to a side of the base assembly.

6. The aircraft seat of claim 4, wherein the one or more deployable armrest assemblies include two or more deployable armrest assemblies, wherein the two or more deployable armrest assemblies include a first deployable armrest assembly coupled to a first side of the base assembly of the primary seating section and an additional deployable armrest assembly coupled to an additional side of the base assembly of the primary seating section.

7. The aircraft seat of claim 1, wherein each deployable armrest assembly further comprises:

a housing configured to at least partially enclose the actuator sub-system.

8. The aircraft seat of claim 7, wherein the housing further comprises:

a stationary housing portion;

a deployable housing portion configured to actuate between one of the stowed position and the deployed position; and a divider line configured to separate the deployable housing portion and the stationary housing portion.

9. The aircraft seat of claim 1, wherein the locking assembly comprises:

a latch;

a release mechanism; and a release cable coupled to the release mechanism, wherein the release mechanism is configured to pull the release cable when a force is applied to the release mechanism, upon applying the force to the release mechanism, the latch, when in the unlocked state, is configured to cause the actuator to actuate the one or more deployable armrest assemblies between one of the stowed position and the deployed position.

10. The aircraft seat of claim 1, wherein the actuator is a gas spring actuator.

11. The aircraft seat of claim 10, wherein the translation system comprises:

one or more tracking rails coupled to one or more brackets; and one or more carriages coupled to the frame, wherein the one or more carriages are configured to translate along an axis of the tracking rail.

12. The aircraft seat of claim 11, wherein the rotational rod includes at least a first end and a second end, wherein the first end is coupled to a first bracket and the second end is coupled to an additional bracket.

13. The aircraft seat of claim 12, wherein the actuator sub-system is configured to actuate the one or more deployable armrest assemblies between the stowed position and deployed position by translating the frame along an axis of the one or more tracking rails, wherein the one or more carriages are configured to translate along the axis of the tracking rail to cause the frame to translate along the axis of the tracking rail, when translating the frame along the axis, the shaft of the rotational rod configured to translate within the slot of the frame along the axis.

14. The aircraft seat of claim 13, upon translating the frame along the axis of the one or more tracking rails, the rotation system of the actuator sub-system is configured to actuate the one or more deployable armrest assemblies between the stowed position and deployed position by rotating the rotational rod about the axis of the shaft of the rotational rod, where the frame rotates about the axis of the shaft of the rotational rod until the frame is arranged substantially parallel with a floor of the aircraft.

\* \* \* \* \*